(12) United States Patent
Yuan

(10) Patent No.: US 8,607,323 B2
(45) Date of Patent: *Dec. 10, 2013

(54) METHOD FOR PROVIDING MEDIA COMMUNICATION ACROSS FIREWALLS

(75) Inventor: Wei Yuan, Plano, TX (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/506,330

(22) Filed: Apr. 11, 2012

(65) Prior Publication Data

US 2012/0227101 A1    Sep. 6, 2012

Related U.S. Application Data

(63) Continuation of application No. 10/642,256, filed on Aug. 15, 2003, now Pat. No. 8,166,533.

(60) Provisional application No. 60/404,198, filed on Aug. 17, 2002.

(51) Int. Cl.
    *G06F 9/00* (2006.01)

(52) U.S. Cl.
    USPC ........ 726/11; 726/1; 726/2; 726/13; 370/351; 705/79; 713/153; 713/154; 709/238; 709/239; 709/240; 709/241; 709/242

(58) Field of Classification Search
    USPC ................. 726/1–20; 370/351; 713/153, 154; 705/79; 709/238–242
    See application file for complete search history.

(56) References Cited

U.S. PATENT DOCUMENTS

| | | | |
|---|---|---|---|
| 6,941,477 B2 * | 9/2005 | O'Keefe | 726/4 |
| 2002/0026478 A1 * | 2/2002 | Rodgers et al. | 709/205 |
| 2003/0212764 A1 * | 11/2003 | Trossen et al. | 709/219 |
| 2003/0212809 A1 * | 11/2003 | Wu et al. | 709/231 |
| 2004/0059942 A1 * | 3/2004 | Xie | 713/201 |

OTHER PUBLICATIONS

"Firewall Requirements for Securing VoIP—Real Time Mixed Media (RTMM) firewalls can secure both," Jun. 13, 2003; www.cConvergence.com.
Greena, Mark; "Firewall and Proxy Server HOWTO;" (Feb. 26, 2000); ispbs.hostplus.net/linux/Firewall-HOWTO.html.
Paul Drew and Chris Gallon; "Next-Generation VoIP Network Architecture;" (Mar. 2003); www.msforum.com.
Tyson; Jeff; "How Firewalls Work;" 2003; www.howstuffworks.com.

(Continued)

*Primary Examiner* — Edan Orgad
*Assistant Examiner* — Roderick Tolentino
(74) *Attorney, Agent, or Firm* — Christopher & Weisberg, P.A.

(57) ABSTRACT

The present invention supports a method for transmitting information packets across network firewalls. A trusted entity is provisioned with an address designation for a pinhole through the firewall during setup of a communication session between two communication devices. This pinhole address is used throughout the communication session between the two communication devices to transmit information packets onto and out of the communication network.
Information packets addressed to the communication device inside the firewall are received by the trusted entity, which replaces address header information in the information packet with the address for the pinhole. The information packet is routed to the pinhole where it passes onto the network for routing to the communication device inside the firewall. Information packets transmitted from the network are also routed to the trusted entity for routing toward the communication device outside the firewall.

19 Claims, 13 Drawing Sheets

(56) References Cited

OTHER PUBLICATIONS

Mercer et al; "Internet Draft: H.323 Firewall Control Interface;" (Nov. 1998).
Hockmuth et al; "Firewall limits vex VoIP users;" (Jul. 8, 2002); Network World.
Rosenberg, J; Internet Draft: SIP Traversal through Residential and Enterprise NATs and Firewalls; (Mar. 2, 2001); IEFT.
Jacobs; S; "Internet Draft: MGCP, MEGACO, and SIP VoIP Signalling Protocol Security Requirements;" (Oct. 2002); Internet Society.
Foster, B, "RFC 3064: MGCP CAS Packages;" (Feb. 2001); Internet Society.
Rosenberg, J. et al. "RFC 3261: Session Initiation Protocol;" (Jun. 2002); Internet Society.

* cited by examiner

METHOD FOR PROVIDING MEDIA COMMUNICATION ACROSS FIREWALLS

RELATED APPLICATION DATA

This application is related to Provisional Patent Application Ser. No. 60/404,198 filed on Aug. 17, 2002, and priority is claimed for this earlier filing under 35 U.S.C. §119(e), and this is a continuation application of Utility patent application Ser. No. 10/642,256 filed on Aug. 15, 2003, and priority is claimed for the earlier filing under 35 U.S.C. §120. The Provisional Patent Application and prior Utility Patent Application are incorporated by reference into this Utility Patent Application.

TECHNICAL FIELD OF THE INVENTION

A method for transmitting information packets with multimedia communication across firewalls.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocol and Packet-Based Communication

The Defense Department's communication protocol governing data transmission between different networks was called the Internet Protocol (IP) standard. The IP standard uses discrete information packets, sometimes called datagrams, to communicate between different computers and other devices and networks over the Internet. The IP standard has been widely adopted for the transmission of discrete information packets across network boundaries. In fact, most telecommunication networks operate using information packets to transmit data to linked communication devices. The IP standard or similar packet-based communication protocols govern communications on these networks as well as the Internet, and businesses are increasingly adopting Internet compatible packet-based communication for private communication networks.

Packet-based communication protocols depend on destination and source address data found in an address header for routing over a communication network. Each information packet's path through the network is controlled by switching or routing decisions based on the address data found in the packet's address header. In a typical information packet-based communication scenario, data is transmitted from an originating communication device on a first network across a transmission medium to a destination communication device on a second network. During transmission, transit routers on the network process the information packet address header to route the individual information packets. After receipt at the destination device, the destination communication device decodes the transmitted information into the original information transmitted by the originating device according to the applicable communication protocol.

Addressing and Routing

A communication device operating on an information packet-based network is assigned a unique physical address. For IP-based networks, this address is referred to as an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network. Other addressing protocols use address headers and similar addressing mechanisms to route information packets.

A router is used to regulate the transmission of information packets into and out of the communication network. Routers interpret the logical address contained in information packet headers and direct the information packets to the intended destination. Information packets addressed between communication devices on the same network do not pass through a router on the boundary of the network, and as such, these information packets will not clutter the transmission lines outside the network. If data is addressed to a communication device outside the network, the router on the network boundary forwards the data onto the greater network.

Network communication protocols define how routers determine the transmission path through a network and across network boundaries. Routing decisions are based upon information in the address header and corresponding entries in a routing table maintained on the router. A routing table contains the information for a router to determine whether to accept an information packet on behalf of a device or pass the information packet onto another router. At each point in the routing path, the receiving or destination router processes the packet to compare the address header information to the routing table maintained on the router for the next router destination. The router then forwards the information packet to the appropriate router determined by the topological data in the routing table.

Firewalls

Private networks using Internet communication resources require secure connections for these communications. Without secure connections, computer hackers or other malicious attackers can access the network and compromise the system. Unprotected systems and networks can suffer remote login, session hijacking, denial of service attacks, e-mail bombs, redirect bombs, spam, viruses, macros, and source routing.

Firewalls are barrier devices placed at the entrance of a communication network to block unauthorized communication. A firewall may be either a program or hardware device, and firewalls basically fall into four categories: packet filters, Application Level Gateways (ALG) (also called proxies), circuit relays, and stateful multilayer inspection firewalls. Packet filters compare the information packet to a set of criteria before allowing the information packet to be forwarded onto the network. ALGs examine information packets at the application layer to block unauthorized applications or protocol information packets. Circuit relays monitor handshaking at the Transport Control Protocol (TCP) level and block unauthorized requested sessions. Stateful multilayer inspection firewalls combine elements of the other three types of firewalls by filtering information packets at the network layer, determining whether session information packets are legitimate, and evaluating information packets at the application layer.

Communication Across Firewalls

Firewalls block unauthorized entities outside the firewall from sending information packets onto the secured network. Network entities inside the firewall can transmit information outside the secured network by creating "pinholes" through the firewall. A "pinhole" is a communication port, also referred to as an IP port, that the network entity designates for sending information packets out of the network and also receiving information packets (e.g. responses) into the network during a communication session. A timer on the firewall starts when the pinhole is created and closes once a specified time duration elapses without any information packets going through the pinhole.

Voice-over-IP (VoIP) telecommunication is the combination of voice, data, video wireless, and multimedia applications into an integrated communication infrastructure based on circuit-switched and TCP/IP technologies and protocols. VoIP represents the next generation of networking technology capable of handling all types of packet-based communications and services. VoIP delivers more services that previously available with separate voice and data networks in conjunction with improved telephone services. VoIP takes advantage of the high voice quality found in voice networks, the ubiquitous nature of TCP/IP protocols, and the efficient use of bandwidth by having voice and data share the same connection. Having only one network with devices to manage offers significant savings, and the existing infrastructure can be utilized rather than requiring replacement. Moreover, VoIP telecommunication networks offer new applications, such as integrated contact centers and unified messages.

A telecommunication service provider with its switching equipment located outside of a firewall may attempt to make VoIP services (e.g. centrix services) or other multimedia communications available to subscribers inside the firewall. But, in order to do so, the service provider must first find a way to penetrate the firewall. Necessary signaling and media messages (e.g. information packets) have to traverse the firewall to reach the end-user's equipment and setup the requisite IP addresses for routing through a designated pinhole.

For example, to setup the call, the first setup message must be sent to the called party from the switching equipment (e.g. a soft-switch) residing outside the firewall. Since the setup message is the first information packet that switch sends to the called party terminal, it is usually blocked by the firewall unless the firewall knows not to block the setup message. Similarly, the first media (e.g. Real Time Transport Protocol message) information packet from the calling party to the called party will be blocked unless the firewall knows not to do so.

Since signaling messages usually are sent to well-known destination communication ports, it is relatively easy to configure a firewall not to block signaling messages sent to these well-known ports. However, this non-blocking function requires a particular firewall to possess network security intelligence to ensure that port is not a security hole in the firewall. Not all networks have such an intelligent firewall, and, in some applications, the switch sends setup messages directly to user terminals.

Transmitting media information packets across the firewall also presents difficulty. The dominant protocol for carrying media information packets is Real-Time Transport Protocol (RTP). RTP information packets use a large range of IP ports for different media connections, so it is not possible to specially configure certain IP ports as can be done for signaling messages. Current methods for providing VoIP across firewalls are based on exchanging messages between firewall equipment and VoIP equipment with the vendors of these types of equipment working together to create and designate pinholes in the firewall. Because most corporations already have IP networks with firewall equipment deployed, it is impractical for a service provider to deploy communication equipment to communicate with all desired communication equipment. The costs for this approach would be prohibitively high. A generic and cost-effective solution for providing multi-media communication, including VoIP, across firewalls without requiring modifications to firewall equipment or an expensive array of communication equipment is needed.

SUMMARY OF THE INVENTION

A trusted entity (a Media Proxy Router, soft switch, or combination of the two) residing outside the firewall of a private network uses signaling messages to create a pinhole through the firewall to transmit media information packets. An established signaling pinhole (e.g. port) across the firewall is used to transmit the signaling messages across the firewall and create a pinhole through the firewall for transmitting media information packets.

A routing table on the trusted entity maintains an association of the address for the location of the pinhole for media communication through the firewall. Information packets containing media communication (e.g. RTP packets) are routed between a first communication device and a second communication device using address header replacement with the address of the firewall pinhole at the trusted entity. The media information packets of a communication session then transit the firewall using this established pinhole.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
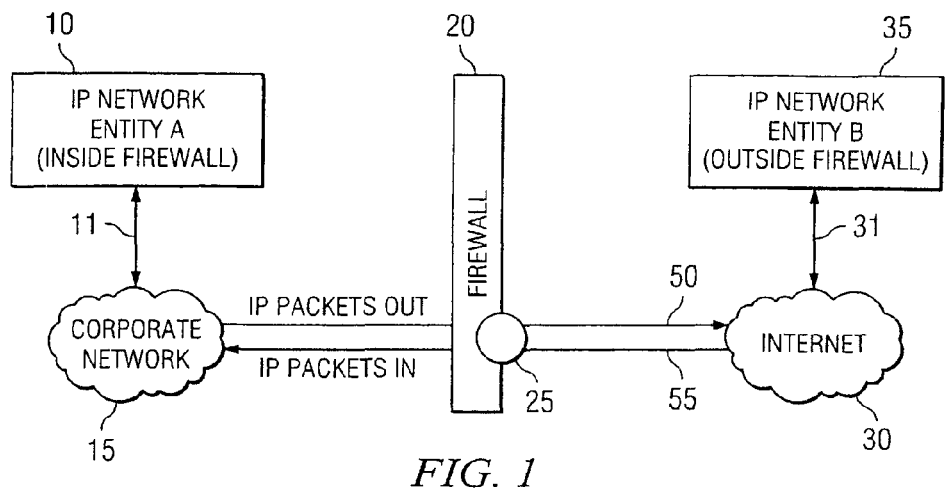
FIG. 1 is a schematic diagram of the basic concept of the invention for communication between an entity A inside a corporate firewall and an entity B outside the firewall.

FIG. 1 shows the basic underlying concept of the invention for transmitting information packets containing multimedia communication across a firewall. An IP Network Entity A 10 is connected to a corporate network 15 by communication link 11. Communication link 11 supports two-way IP information packet transmission between the IP Network Entity A 10 and the corporate network 15. The corporate network 15 is protected by a firewall 20. The firewall 20 blocks information packet transmissions from outside the corporate network 15 from entering the corporate network 15.

Transmission of information packets across the firewall 20 uses a pinhole 25. The pinhole 25 is a communication port on the firewall 20 (e.g. typically the firewall resides on a gateway or other computer server acting as a gateway node). The pinhole is created by the first message that IP Network Entity A 10 sends to IP Network Entity 35. An IP Network Entity B 35 residing outside the corporate network 15 communicates across communication link 31 using the Internet 30. IP packets are transmitted outside the corporate network 15 to the IP Network Entity A 10 using communication link 50 to the Internet 30 across pinhole 25. IP packets are transmitted into the corporate network 15 to the IP Network Entity A 10 using communication link 55 to the Internet 30 across pinhole 25. An IP address corresponding to the pinhole's topological location is used to route information packets across the firewall 20.

Figure 2:
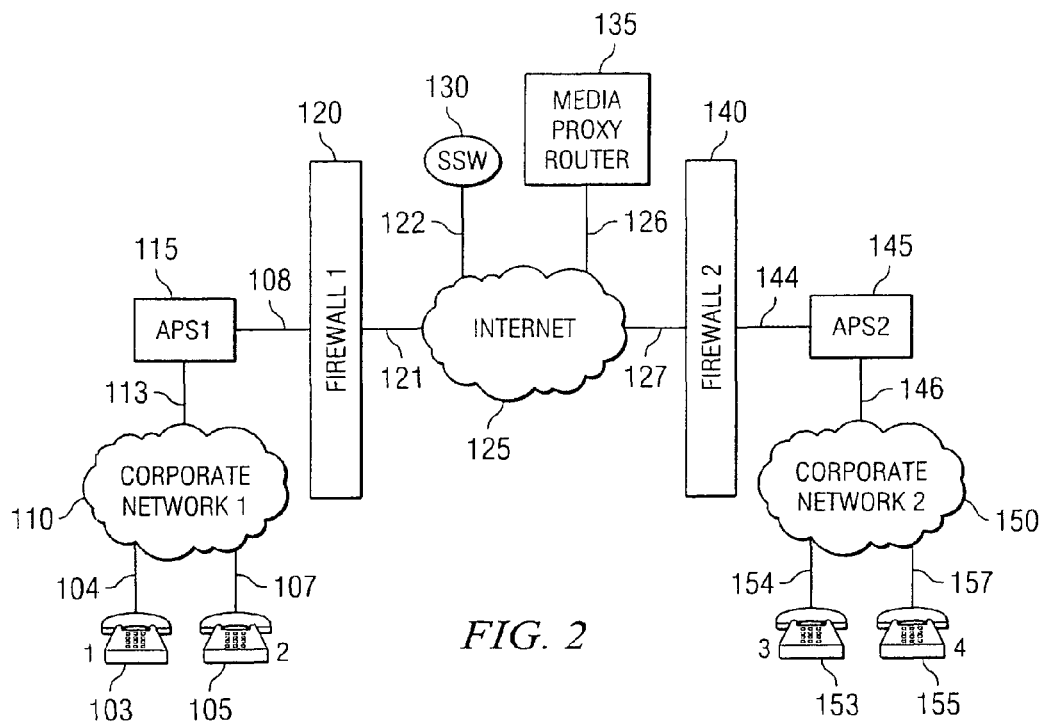
FIG. 2 is a schematic diagram for a communication session using the invention with an application server deployed inside the corporate firewalls of two private corporate networks.

FIG. 2 shows a network architecture for communication between two corporate networks that implements the invention using a trusted entity outside the firewall with an application server deployed within the firewall. The application server can be a SIP proxy server, an Integrated Access Device (IAD), or an Application Proxy Server (APS), which is a special type of Media Proxy Router. Communication device 1 103 is connected to the corporate network 1 110 by communication link 104. Communication device 2 105 is connected to the corporate network 1 110 by communication link 107. The corporate network 1 110 is connected to an application proxy server 1 (APS 1) 115 by communication link 113, and the APS 1 115 is connected to the firewall 1 120 by communication link 108. The APS 1 115 is a special type media proxy server that acts as a proxy for all end-terminals, including communication device 1 103 and communication device 2 105, and has the capability for creating pinholes for media information packets and signaling messages to transit the firewall 1 120.

The firewall 1 120 is connected to the Internet 125 by communication link 121. A soft-switch (SSW) 130 is connected to the Internet 125 by communication link 122 and communicates with the corporate network 110 over the Internet 125 and communication link 121. The SSW 130 is a software application interface (API) used to bridge a public switched telephone network (PSTN) and VoIP. The SSW 130 separates the call control functions of a phone call from the media information data.

The Media Proxy Router 135 is also connected to the Internet 125 by communication link 126 and communicates with the corporate network 110 over the Internet 125 and communication link 121. The Media Proxy Router 135 is a network entity (e.g. server, workstation, or gateway-type hardware) that performs IP address translation on signaling/media information packets (e.g. MGCP/RTP packets). The Media Proxy Router 135 and the SSW 130 can share the same physical "box" and communicate directly with each other and not over the Internet 125.

The Internet 125 is also linked to a second corporate network. The Internet 125 is connected to firewall 2 140 by communication link 127, and the SSW 130 and Media Proxy Router 135 can communicate with the second corporate network using the Internet 125 and communication link 127. The firewall 2 140 is connected to APS 2 145 by communication link 144. The APS 2 145 is connected to the corporate network 2 150 by communication link 146. Communication device 3 153 is connected to the corporate network 2 150 by communication link 154, and communication device 4 is connected to the corporate network 2 150 by communication link 157.

Figure 3:
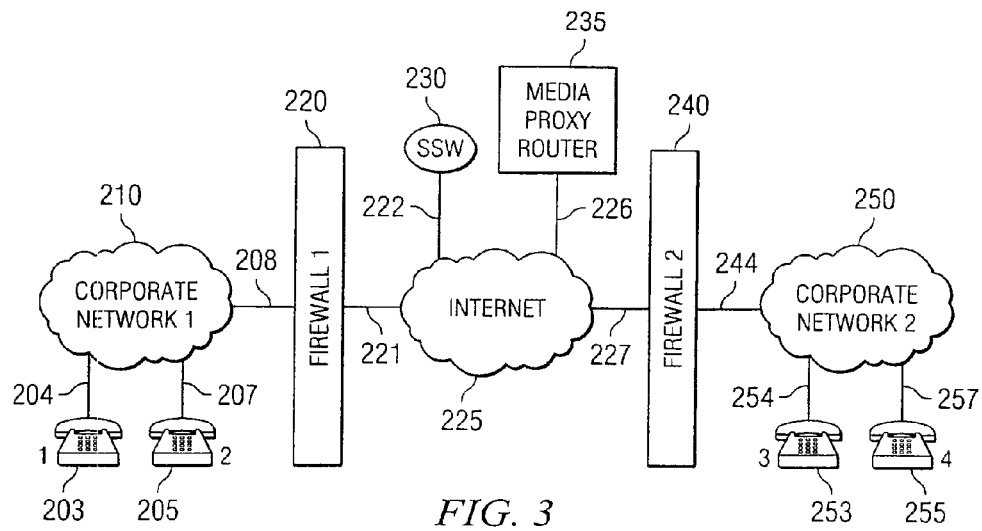
FIG. 3 is a schematic diagram for a communication session using the invention without an application server deployed inside the corporate firewalls of two private corporate networks.

FIG. 3 shown an alternate network architecture that lacks an APS deployed inside the firewall. Without a deployed APS, the end-terminals (e.g. communication devices such as phones) must possess a certain degree of intelligence to directly communicate with media-over-IP equipment outside the firewall to create pinholes through the firewall. Communication device 1 203 is connected to the corporate network 1 210 by communication link 204. Communication device 2 205 is connected to the corporate network 1 210 by communication link 207, and the corporate network 1 210 is connected to the firewall 1 220 by communication link 208.

The firewall 1 220 is connected to the Internet 225 by communication link 221. A soft-switch (SSW) 230 is connected to the Internet 225 by communication link 222 and communicates with the corporate network 1 210 over the Internet 225 and communication link 221. The SSW 230 is a software application interface (API) used to bridge a public switched telephone network (PSTN) and VoIP. The SSW 230 separates the call control functions of a phone call from the media information data.

The Media Proxy Router 235 is also connected to the Internet 225 by communication link 226 and communicates with the corporate network 1 210 over the Internet 225 and communication link 221. The Media Proxy Router 235 is a network entity (e.g. server, workstation, or gateway-type hardware) that performs IP address translation on signaling/media information packets (e.g. MGCP/RTP packets). The Media Proxy Router 235 and the SSW 230 can share the same physical "box" and communicate directly with each other and not over the Internet 225.

The Internet 225 is also linked to a second corporate network. The Internet 225 is connected to firewall 2 240 by communication link 227, and the SSW 230 and Media Proxy Router 235 can communicate with the second corporate network using the Internet 225 and communication link 227. The firewall 2 240 is connected to the corporate network 2 250 by communication link 244. Communication device 3 253 is connected to the corporate network 2 250 by communication link 254, and communication device 4 is connected to the corporate network 2 250 by communication link 257.

Figure 4:
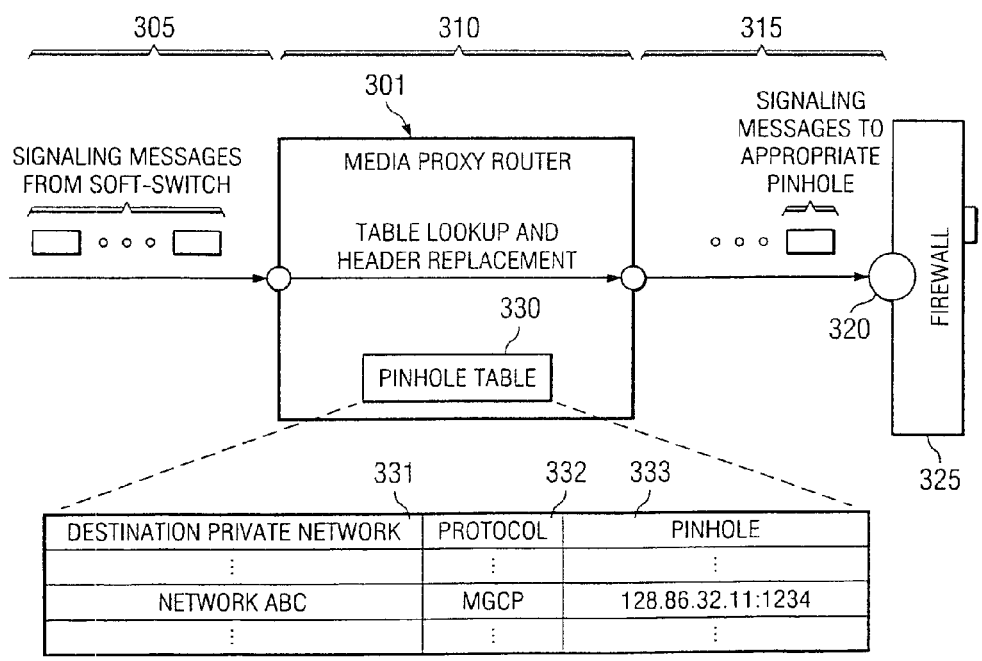
FIG. 4 is a schematic diagram showing signaling address translation by the Media Proxy Router for routing signaling message information packets.

FIG. 4 shows the operation of the Media Proxy Router in the invention for handling signaling information packets. The Media Proxy Router 301 performs IP address translation on signaling and media information packets. For signaling messages, the process 305 includes receiving signaling packets forwarded from the soft-switch. The IP address header in these signaling messages are translated in process 310 by the Media Proxy Router 301 by looking up the destination corporate network and replacing the IP address header maintained in a routing table corresponding to a pinhole 320 on the firewall 329. In process 310, the signaling messages are routed to the appropriate pinhole 320 in the firewall 325. The pinhole routing table 330 in the Media Proxy Router 301 includes an entry 331 for the IP identifier (e.g. IP address for network ABC) of the destination network, an entry 332 for the protocol of the signaling message (e.g. MGCP), and an entry 333 for the corresponding firewall pinhole IP address compatible with that signaling protocol on that network.

Figure 5:
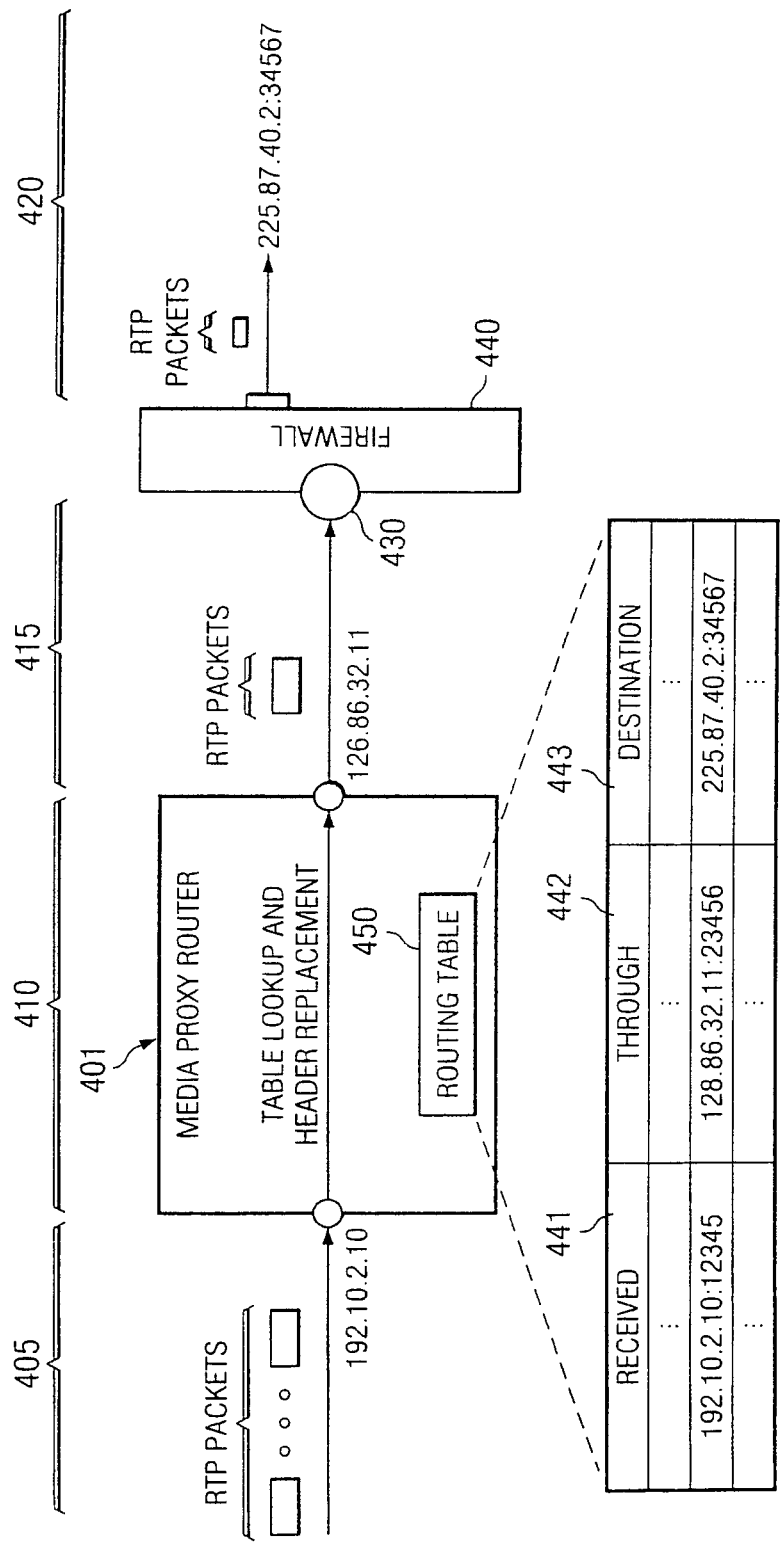
FIG. 5 is a schematic diagram showing media information packet address translation by the Media Proxy Router for routing media information packets.

FIG. 5 shows the operation of the Media Proxy Router in the invention for handling media information packets (e.g. RTP packets). For media messages, the process 405 includes receiving media information packets forwarded from the soft-switch. The IP address header in these media messages are translated in process 410 by the Media Proxy Router 401, which has a designated IP address of 192.10.2.10:12345. The Media Proxy Router 401 looks up and replaces the destination IP address, which corresponds to the IP address of the Media Proxy Router 401, with IP address 128.86.32.11:23456, which is the corresponding IP address of pinhole 430 in the firewall 440. The Media Proxy Router 401 also inserts the destination address of the communication device on the network, which is 225.87.40.2:34567, into the IP header address information data fields of the media information packet. The Media Proxy Router 401 transmits the media information packet (e.g. the RTP packet) to the IP address of the pinhole 430 through the firewall 440 in process 415. In process 420, the RTP packet is routed to the destination corresponding to the destination address inserted into the RTP packet by the Media Proxy Router 401. The routing table 450 stored in the Media Proxy Router 401 includes the received IP address 441, the through IP address 442 for the firewall pinhole 430, and the ultimate destination IP address 443 of the RTP packet.

Figure 6:
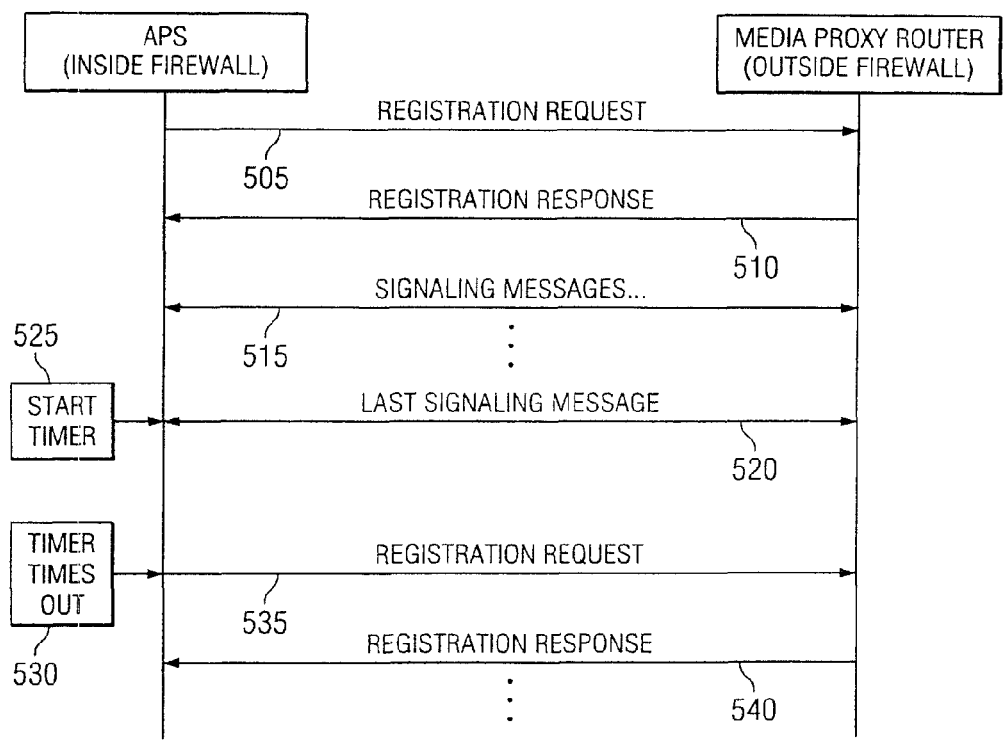
FIG. 6 shows the registration message flow for registering with an Application Proxy Server (APS) deployed inside the firewall.

FIG. 6 shows the basic signaling message flow for the invention used to provision the routing table entries in the Media Proxy Router. In order for End-Terminals inside the firewall to receive signaling messages towards them, the APS inside the firewall (see FIG. 2) or the communication device if there is no APS (see FIG. 3), at initiation time send a Registration Request message to the Media Proxy Router outside the firewall at step 505. This Registration Request message contains information on the application server, the subscribers (e.g. the communication devices), and the terminal inside the firewall.

The Registration Request message creates a pinhole on the firewall. The Media Proxy Router obtains the pinhole information from the origination IP address and port of the Registration Request message. The Media Proxy Router records the pinhole information in the routing table maintained on the router and will forward all the signaling messages addressed to subscribers inside the firewall to that pinhole.

After receiving the Registration Request message from the application server, in step 510 the Media Proxy Router sends a Registration Response message back the application server confirming the success/failure of the registration. If the registration fails, it sets a failure alarm and resends the Registration Request message to the Media Proxy Router. If the registration is successful, the APS starts a timer that resets to zero if a message goes through the pinhole. In step 515, signaling messages are transmitted between the APS or communication device and the Media Proxy Router.

At step 520, the last signaling message is transmitted, and the timer begins a countdown at step 525. If no message passes through the pinhole for a configured time period, the timer times out in step 530. In step 535, the APS sends a new Registration Request to the Media Proxy Router. This new Registration Request message prevents the firewall from closing the pinhole after a specified inactive time duration. Thus, the configured time period for resending Registration Request must be shorter than the inactive time duration specified for closing pinholes on the firewall. In step 540, the trusted Media Proxy Router sends a Registration Response message back the APS or communication device confirming the success/failure of the registration. If successful, the pinhole remains open for additional signaling message transmissions.

Figure 7:
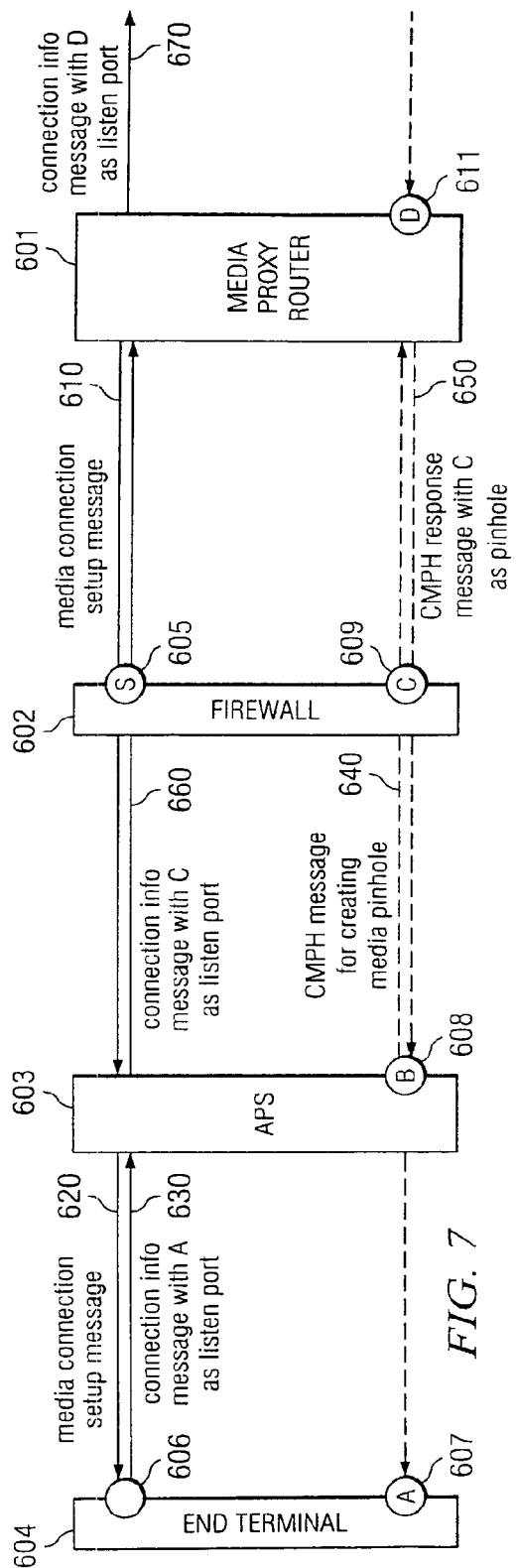
FIG. 7 shows the invention operation with an APS deployed inside the firewall.

FIG. 7 shows the message flow of media information packets penetrating a firewall with an APS deployed inside the firewall. In step 610, a signaling message for creating a media connection is sent through the firewall 602 pinhole 605 for communicating signaling messages (e.g. the signaling pinhole) to the APS 603. This signaling message is dependent on the protocol being used (e.g. an INVITE in Session Initiation Protocol (SIP), Create Connection (CRCX) in Media Gateway Control Protocol (MGCP), etc). In step 620, the APS 603 forwards the signaling message for creating a media connection to the appropriate End-Terminal 604 at port A 606 used for signaling message processing. In step 630, the End-Terminal 604 creates a media connection by transmitting a connection information message (e.g. 200 OK in SIP, Create Connection Acknowledge (CRCX ACK) in MGCP, etc.) designating a listening IP address/port A 606 to the Media Proxy Router 601 through the APS 603. The APS 603 processes the connection information message before transmission to the Media Proxy Router 601.

In step 640, the APS 603 first sends an IP packet designated as a Create Media Pinhole (CMPH) message from port B 608 to the Media Proxy Router to create a pinhole for media information packets to transit the firewall. This CMPH message contains the address corresponding to the pinhole used to transit the firewall—port C 609. The APS 603 also creates a mapping entry (port B 608→port A 607) in its routing table for routing media information packets to the End-Terminal 604. Upon receiving the CMPH message, in step 650 the Media Proxy Router 601 sends a CMPH Response message back to APS 603 through port C 609. The CMPH Response message contains the pinhole information (e.g. IP address/ port C 609) that is the origination IP address and port seen in the received CMPH by the Media Proxy Router 601.

Upon receiving the CMPH Response, the APS 603 replaces the IP address and port for listening for media information packets (e.g. port B 608) in the connection information message with the IP address and port (e.g. port C 609) of the pinhole found in the CMPH Response. The APS 603 then sends the connection information message with the newly designated pinhole address and port as its media information packet listening address and port (e.g. port C 609) to the Media Proxy Router 601 in step 660. In step 670, after receiving the new connection information message, the Media Proxy Router opens port D 611 for listening for media information packets (e.g. RTP packets) from the other party, and creates a mapping entry (port D 611→port C 609) in its routing table. The Media Proxy Router then sends the connection information message, with IP address/port designated as D 611 to the appropriate entity (e.g. the other party or the soft-switch).

When the Media Proxy Router 601 receives media information packets (e.g. RTP packets) from the other party at its designated IP address/port D 611, it forwards the media information packets to IP address/port C 609 on the firewall according to its routing table (port D 611→port C 609). Those media information packets are forwarded to IP address/port B 608 by the firewall since the pinhole (port C 609) is created from IP address/port B 608. Upon receiving those media information packets, the APS 603 forwards them to IP address/port A 607 on the End-Terminal according to its routing table (port B 608→port A 607). Using this method, media information packets from the other party are able to cross the firewall and reach the targeted End-Terminal 604.

Figure 8:
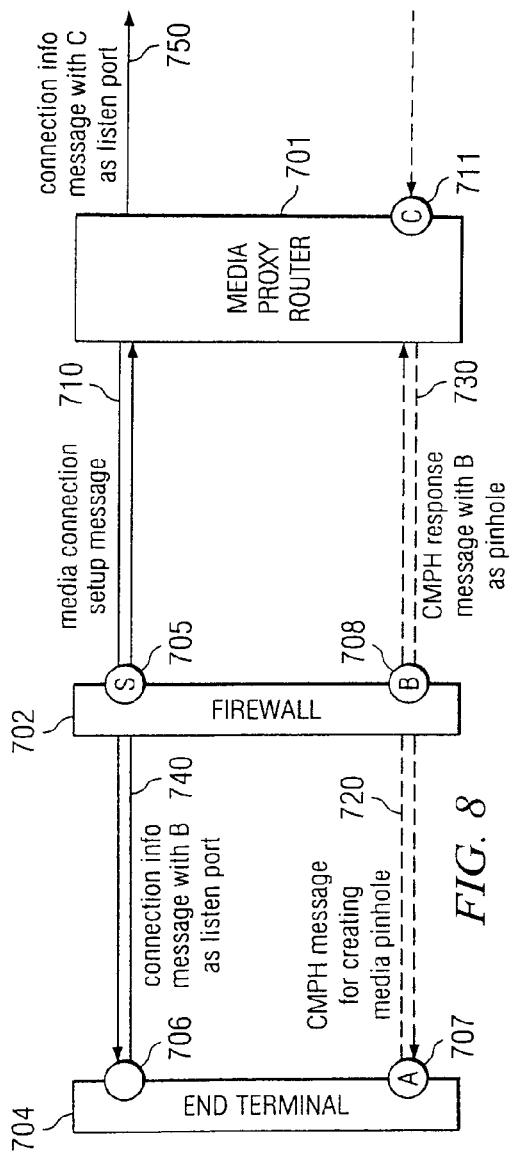
FIG. 8 shows the invention operation without an APS deployed inside the firewall.

FIG. 8 shows the message flow of media information packets penetrating a firewall without an APS deployed inside the firewall. In step 710, a signaling message for creating a pinhole is sent through the firewall 702 pinhole 705 for signaling messages to the End-Terminal 704 port 706 for signaling messages. The End-Terminal 704 reacts by sending an IP packet, a CMPH message, from port A 707, which will be used to listen to media information packets to the Media Proxy Router 701, to create a pinhole for media information packets to transmit the firewall 702 in step 720. This CMPH message contains the address corresponding to the pinhole used to transit the firewall—port B 708. Upon receiving the CMPH message, in step 730 the Media Proxy Router 701 sends a CMPH Response back to the End-Terminal 704 through the pinhole 708 in firewall 702. The CMPH Response contains the pinhole information (IP address/port B 708) that is the origination IP address and port seen in the received CMPH by the Media Proxy Router 701.

In step 730, upon receiving the CMPH Response message, the End-Terminal 704 constructs a connection information message with the designated listening IP address/port B 708 of the pinhole (found in the CMPH Response), and then sends the connection information message to the Media Proxy Router 701 in step 740. When receiving the new connection information message sent in step 740, the Media Proxy Router 701 opens port C 711 for listening for media information packets (e.g. RTP packets) from the other party, and creates a mapping entry (port C 711→port B 708) in its routing table. The Media Proxy Router 701 then sends the connection information message with IP address/port for the newly-opened port C 711 to the appropriate entity (e.g. the other party, or the soft-switch) in step 750.

When the Media Proxy Router 701 receives media information packets (e.g., RTP packets) from the other party at its designated IP address/port C 711, it forwards the media information packets to IP address/port B 708 on the firewall according to its routing table (port C 711→port B 708). Those media information packets will be forwarded to IP address/port A 707 by the firewall since the pinhole (port B 708) is created from IP address/port A 707, which is the listening port of the End-Terminal 704. Using this method, the media information packets from the other party are able to cross the firewall 702 and reach the targeted End-Terminal 704.

In both cases (APS deployed or not), the first signaling message for creating a media connection may not exist. For example, if the End-Terminal initiates a media connection (e.g. sending a first INVITE message if using SIP), then a media connection setup message is not required. Also in both cases (APS deployed or not), the CMPH Response message may not be necessary. If not using CMPH response message, the APS or the End-Terminal (in case of APS not deployed) will have to first send an IP packet and a connection information message with its actual listening address/port to the Media Proxy Router. This IP packet is for creating a pinhole for media information packets. Upon receiving both messages (CMPH and connection information message), the Media Proxy Router opens a new port for listening for media information packets (e.g. RTP packets) from the other party, and creates a mapping entry, which maps the newly-opened port to the pinhole address/port in its routing table. The Media Proxy Router then sends a new connection information message with the IP address/port for this newly-opened port, to the appropriate entity (e.g. the other party or the soft-switch).

Figure 9:
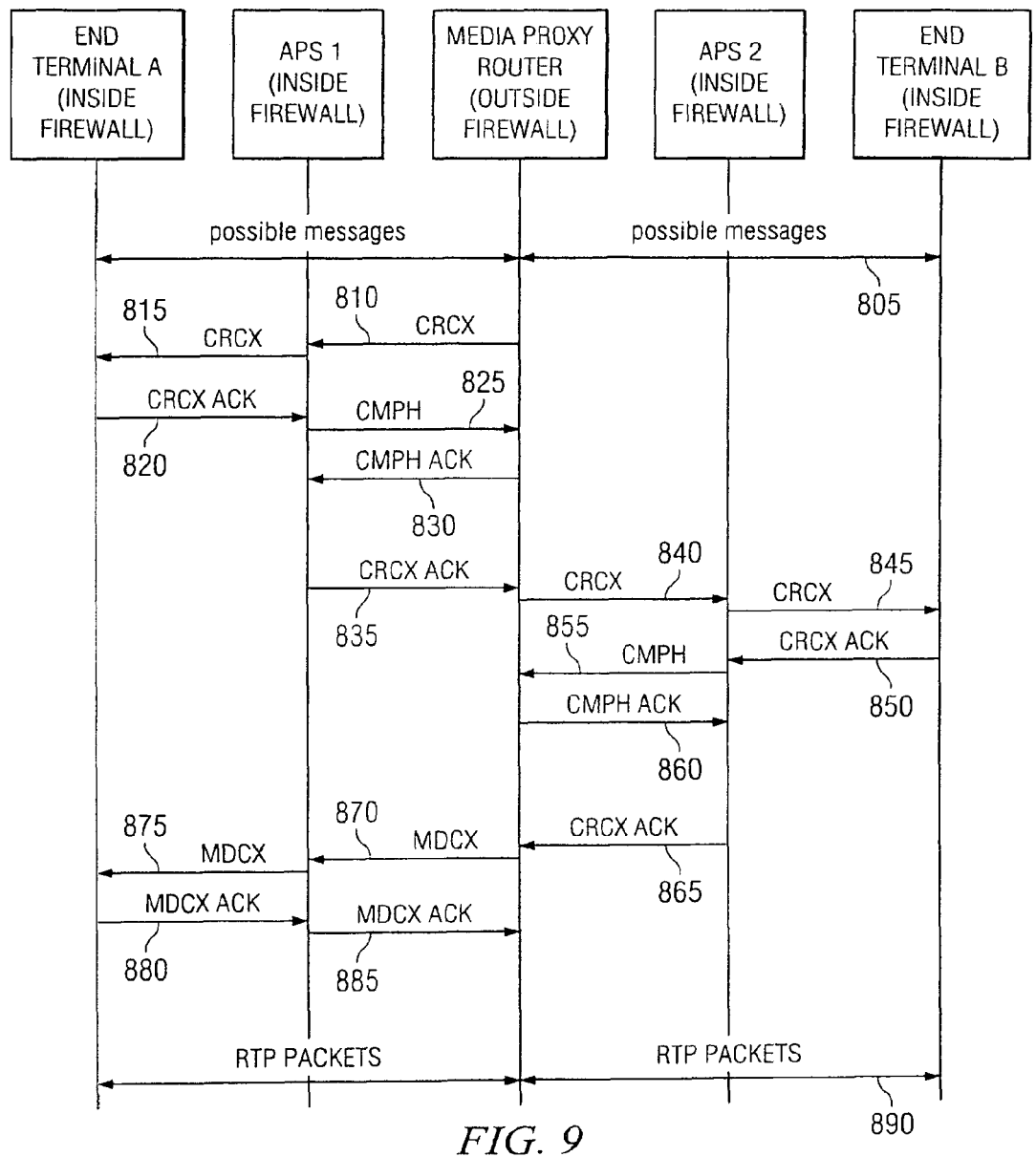
FIG. 9 shows the message flow for the invention with an APS deployed for the MGCP protocol.

FIG. 9 shows the message flow using the Media Gateway Control Protocol (MGCP) for signaling message flow for penetrating firewalls with an APS deployed inside the firewalls (e.g. FIG. 2). In step 805, possible setup messages are exchanged between the End-Terminals, the APSs, and the Media Proxy Router, such as RQNT, NTFY, etc. In step 810, the message exchange to setup the pinhole of the invention begins with a CRCX message sent from the Media Proxy Router to the APS 1 on a first network. In step 815, the APS 1 transmits a CRCX message to End-Terminal A on the first network. In step 820, the APS 1 responds with a CRCX ACK message to the APS 1. The APS 1 then generates a Create Media Pinhole (CMPH) message and transmits the CMPH to the Media Proxy Router. In step 830, the Media Proxy Router transmits a Create Media Pinhole Acknowledge (CMPH ACK) message to the APS 1. In step 835, the APS 1 transmits a CRCX ACK message to the Media Proxy Router.

In step 840, the Media Proxy Router transmits a CRCX message to an APS 2 on a second network (e.g. FIG. 2). The APS 2 transmits a CRCX message to End-Terminal B in step 845. In step 850, End-Terminal B transmits a CRCX ACK message to APS 2, and APS 2 transmits a CMPH message to the Media Proxy Router in step 855. In step 860, the Media Proxy Router generates and transmits a CMPH ACK message to APS 2, and APS 2 responds with a CRCX ACK message back to the Media Proxy Router in step 865. In step 870, the Media Proxy Router transmits a Modified Connection (MDCX) message to APS 1. In step 875, APS 1 forwards the MDCX message to End-Terminal A. The End-Terminal A responds with a Modified Connection Acknowledge (MDCX ACK) message to APS 1 in step 880, and APS 1 forwards the MDCX ACK message to the Media Proxy Router in step 885. This completes creation of firewall pinholes, so that in step 890 RTP media information packets are transmitted between End-Terminal A and End-Terminal B.

Figure 10:
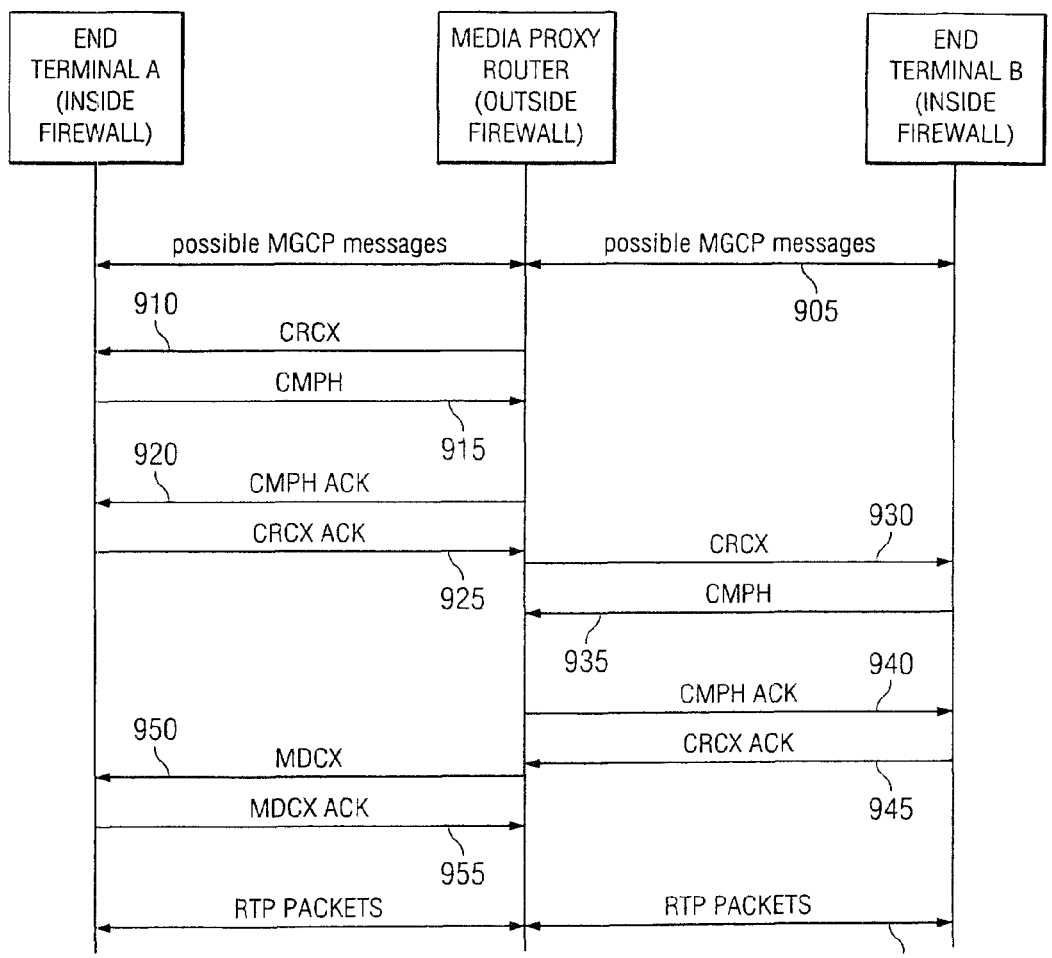
FIG. 10 shows the message flow for the invention without an APS deployed for the MGCP protocol.

FIG. 10 shows the MGCP message flow for penetrating firewalls with no APS deployed inside the firewall (e.g. FIG. 3). In step 905, possible setup messages are exchanged between the End-Terminals, the APSs, and the Media Proxy Router, such as RQNT, NTFY, etc. In step 910, the Media Proxy Router transmits a CRCX message to End-Terminal A on a first network. In step 915, the End-Terminal A sends a CMPH message to the Media Proxy Router, and the Media Proxy Router responds with a CMPH ACK message in step 920. In step 925, the End-Terminal A responds with a CRCX ACK message to the Media Proxy Router.

In step 930, the Media Proxy Router sends a CRCX message to the End-Terminal B on a second network. End-Terminal B responds with a CMPH message to the Media Proxy Router in step 935. In step 940, the Media Proxy Router responds to the End-Terminal B with a CMPH ACK message. The End-Terminal B then sends a CRCX ACK message to the Media Proxy Router in step 945. In step 950, the Media Proxy Router transmits a MDCX message to End-Terminal A, and End-Terminal A responds to the Media Proxy Router with a MDCX ACK message in step 955. This establishes the pinholes in the firewalls on the two networks, so End-Terminal A and End-Terminal B can transmit RTP packets between each other in step 960.

Figure 11:
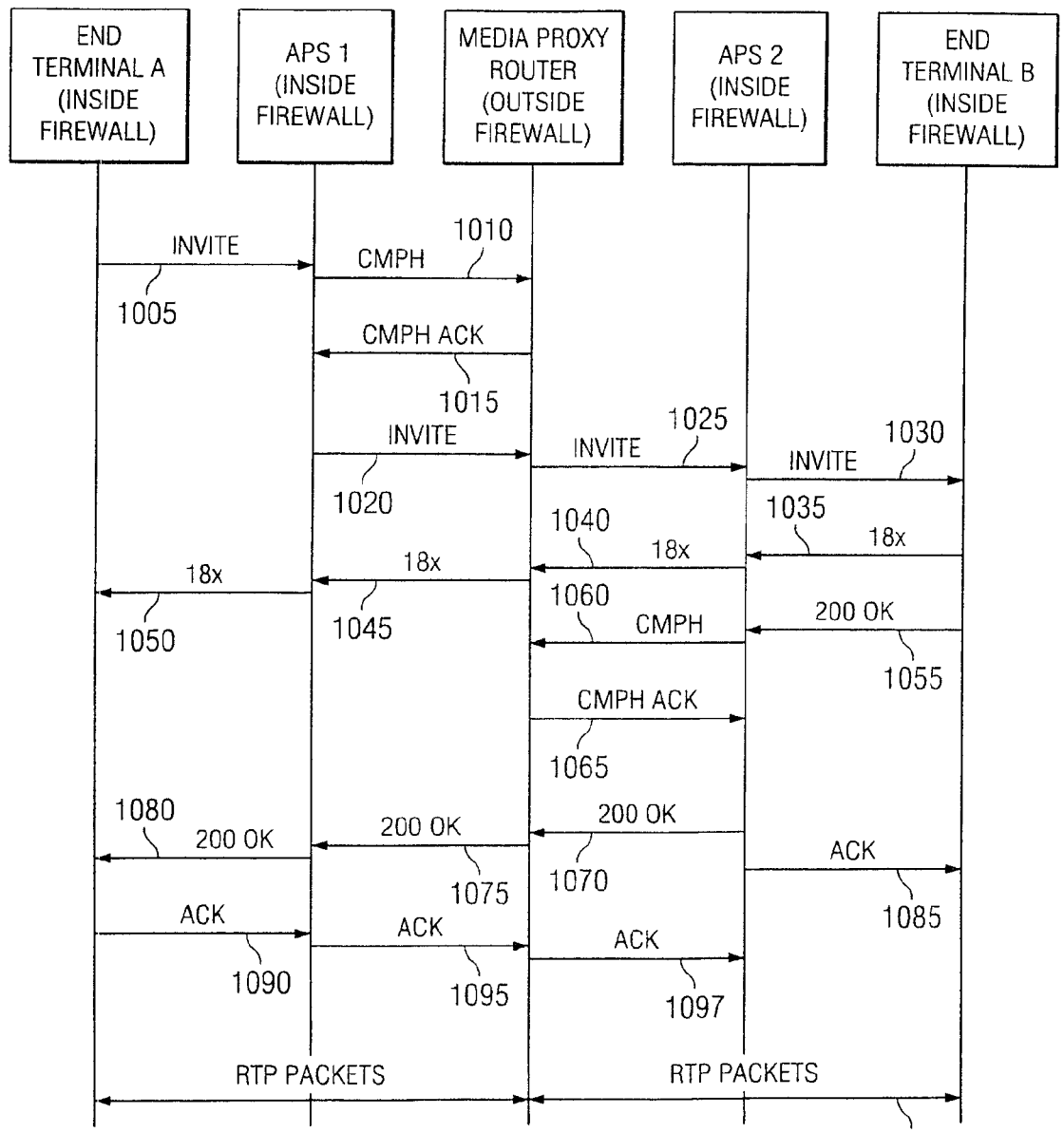
FIG. 11 shows the message flow for the invention with an APS deployed for the SIP protocol.

FIG. 11 shows a Session Initiation Protocol (SIP) message flow for penetrating firewalls with an APS deployed inside the firewalls. In step 1005, End-Terminal A on a first network sends a SIP INVITE message to APS 1, which then transmits a CMPH message to the Media Proxy Router in step 1010. In step 1015, the Media Proxy Router sends a CMPH ACK message to the APS 1. The APS 1 then sends an INVITE message to the Media Proxy Router in step 1020. The Media Proxy Router forwards the INVITE message to APS 2 on a second network in step 1025, which in turn forwards the INVITE message to End-Terminal B, also on the second network, in step 1030. In step 1035, the End-Terminal B transmits an 18× message to the APS 2. The APS 2 forwards the 18× message to the Media Proxy Router in step 1040. In step 1045, the Media Proxy Router forwards the 18× message to APS 1, and APS 1 sends the 18× message to End-Terminal A in step 1050.

In step 1055, End-Terminal B transmits a 200 OK message to APS 2. The APS 2 transmits a CMPH message to the Media Proxy Router in step 1060. In step 1065, the Media Proxy Router responds to APS 2 with a CMPH ACK message. In step 1070, APS 2 transmits a 200 OK message to the Media Proxy Router. The Media Proxy Router forwards the 200 OK message to the APS 1 in step 1075, and APS 1 forwards the 200 OK message to End-Terminal A in step 1080. The End-Terminal A responds by generating and transmitting an ACK message in step 1090 to APS 1. In step 1095, APS 1 forwards the ACK message to the Media Proxy Router, which in turn forwards the ACK message to APS 2 in step 1097. This completes creation of firewall pinholes, so that in step 1100 RTP media information packets are transmitted between End-Terminal A and End-Terminal B.

Figure 12:
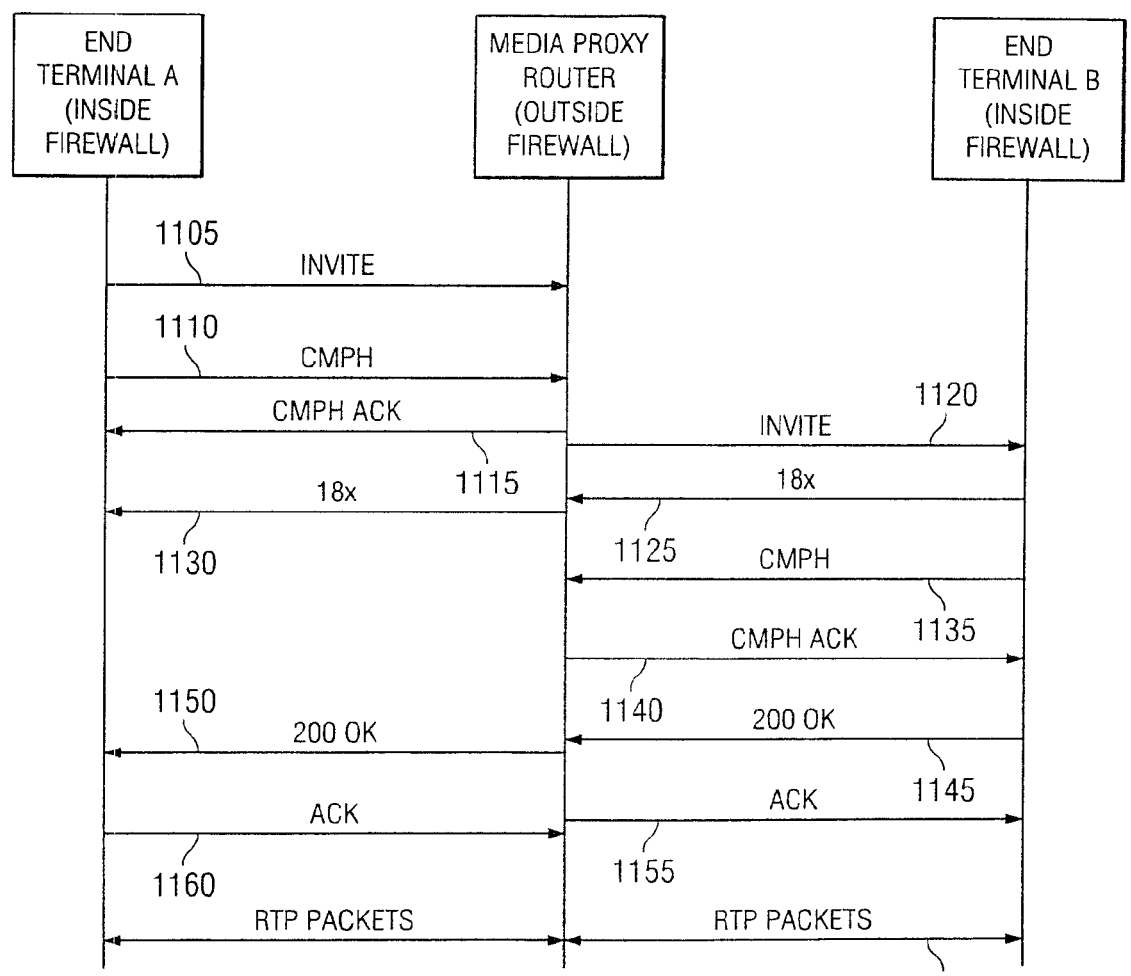
FIG. 12 shows the message flow for the invention without an APS deployed for the SIP protocol.

FIG. 12 shows the Session Initiation Protocol (SIP) message flow for penetrating firewalls with no APS deployed inside the firewalls. The End-Terminal A transmits an INVITE message to the Media Proxy Router in step 1105. In step 1110, End-Terminal A transmits a CMPH message to the Media Proxy Router, and the Media Proxy Router responds with a CMPH ACK message in step 1115 to End-Terminal A. In step 1120, the Media Proxy Router transmits an INVITE message to End-Terminal B. In step 1125, End-Terminal B transmits an 18× message to the Media Proxy Router. The Media Proxy Router in step 1130 forwards the 18× message to End-Terminal A. In step 1135, End-Terminal B transmits a CMPH message to the Media Proxy Router, and the Media Proxy Router responds with a CMPH ACK message in step 1140 to End-Terminal B.

In step 1145, End-Terminal B transmits a 200 OK message to the Media Proxy Router, which forwards the 200 OK message to End-Terminal A in step 1150. In step 1155, the Media Proxy Router transmits an ACK message to End-Terminal B, and in step 1160, End-Terminal A transmits an ACK message to the Media Proxy Router. This completes creation of firewall pinholes, so that in step 1165 RTP media information packets are transmitted between End-Terminal A and End-Terminal B.

Figure 13:
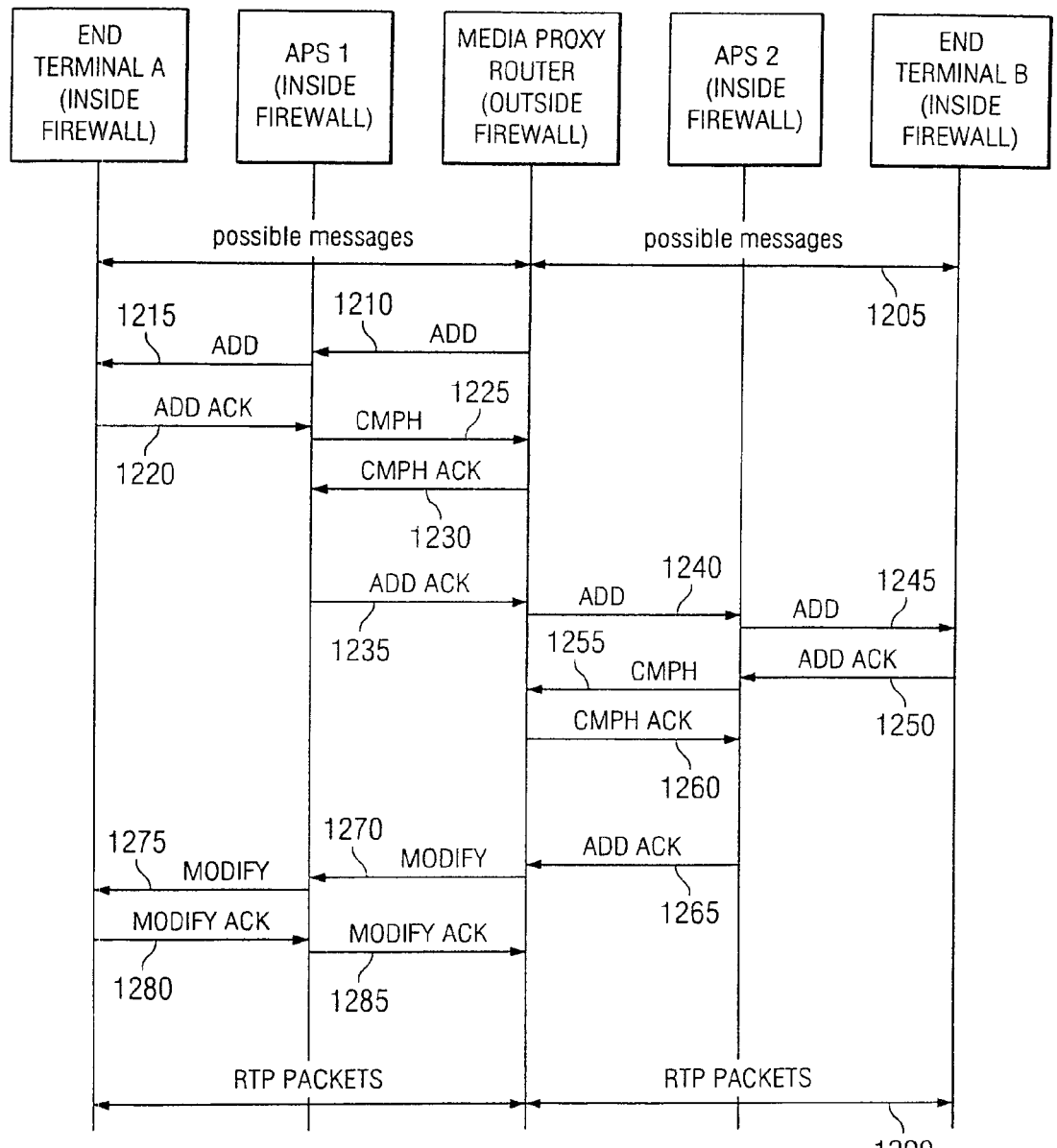
FIG. 13 shows the message flow for the invention with an APS deployed for the H.248 protocol.

FIG. 13 shows the H.248 (MEGACO) message flow for penetrating firewalls with an APS deployed inside the firewalls. In step 1205, possible setup messages such as Notify Request, Notify, etc. are transmitted between the End-Terminals and the Media Proxy Router. In step 1210, the Media Proxy Router transmits an ADD message to APS 1 on the first network, and in step 1215, APS 1 forwards the ADD message to End-Terminal A. In step 1220, End-Terminal A responds with an ADD ACK message to APS 1. The APS 1 transmits a CMPH message to the Media Proxy Router in step 1225. The Media Proxy Router then responds with a CMPH ACK message to APS 1 in step 1230. In step 1235, APS 1 transmits an ADD ACK to the Media Proxy Router.

In step 1240, the Media Proxy Router transmits an ADD message to APS 2, and in step 1245, APS 2 forwards the ADD message to the End-Terminal B. In step 1250, an ADD ACK message is transmitted from End-Terminal B to APS 2. In step 1255, APS 2 transmits a CMPH message to the Media Proxy Router, and the Media Proxy Router responds with a CMPH ACK message to APS 2 in step 1260. In step 1265, APS 2 transmits an ADD ACK message to the Media Proxy Router.

In step 1270, the Media Proxy Router transmits a MODIFY message to APS 1, and APS 1 forward the MODIFY message to End-Terminal A in step 1275. In step 1280, the End-Terminal A responds with a MODIFY ACK message to APS 1, and in step 1285, APS 1 forwards the MODIFY ACK message to the Media Proxy Router. This completes creation of firewall pinholes, so that in step 1290 RTP media information packets are transmitted between End-Terminal A and End-Terminal B.

Figure 14:
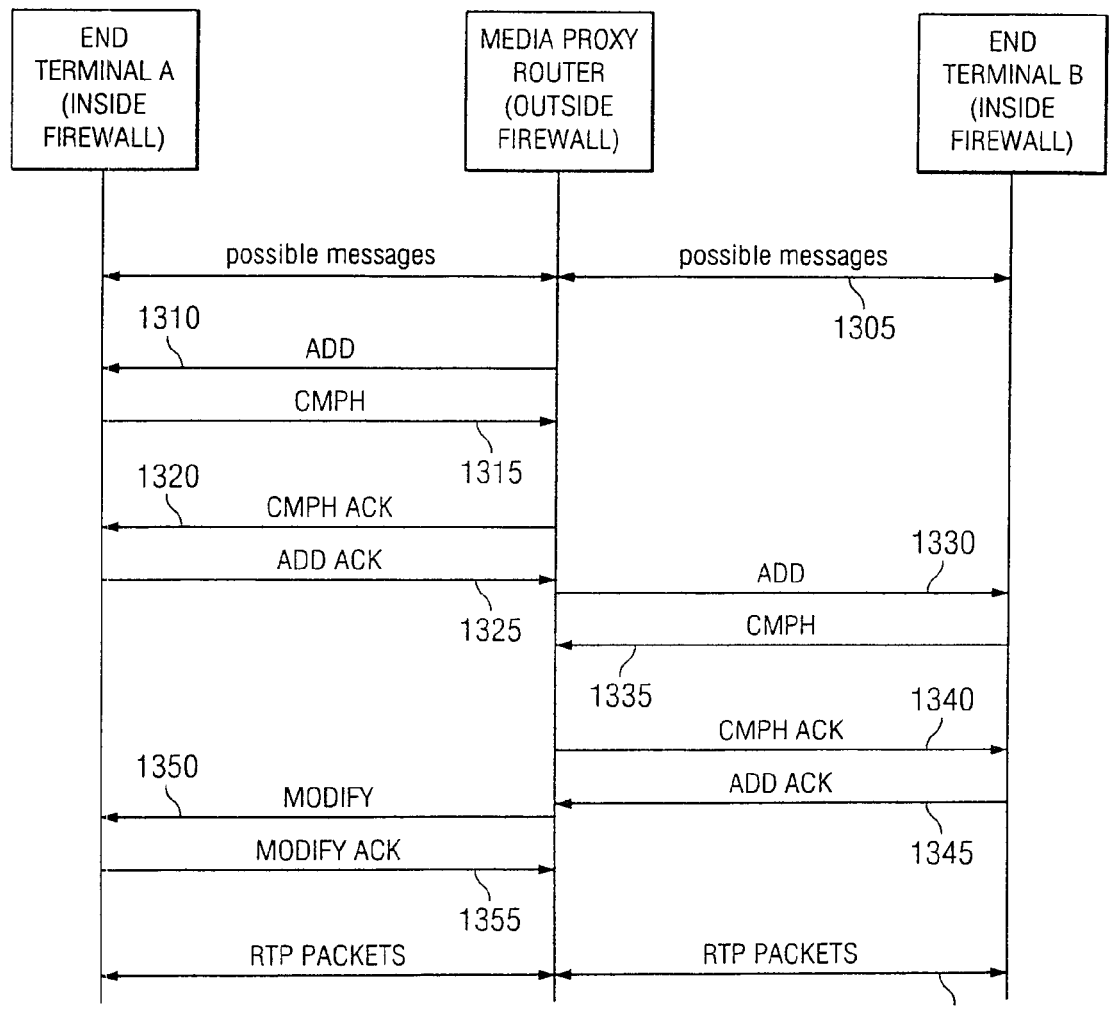
FIG. 14 shows the message flow for the invention without an APS deployed for the H.248 protocol.

FIG. 14 shows H.248 (MEGACO) message flow for penetrating firewalls with no APS deployed inside the firewalls. In step 1305, possible setup messages such as Notify Request, Notify, etc. are transmitted between the End-Terminals and the Media Proxy Router. The Media Proxy Router transmits an ADD message to End-Terminal A in a first network in step 1310. In step 1315, End-Terminal A transmits a CPMH message to the Media Proxy Router. In step 1320, the Media Proxy Router transmits a CMPH ACK message to End-Terminal A, and in step 1325, the End-Terminal A responds with an ADD ACK message back to the Media Proxy Router.

In step 1330, the Media Proxy Router transmits an ADD message to End-Terminal B in a second network. In step 1335, End-Terminal B responds by transmitting a CMPH message to the Media Proxy Router. In step 1340, the Media Proxy Router responds with a CMPH ACK message to End-Terminal B. In step 1345, End-Terminal B responds with an ADD ACK message to the Media Proxy Router. In step 1350, the Media Proxy Router transmits a MODIFY message to End-Terminal A. End-Terminal B then responds with a MODIFY ACK to the Media Proxy Router in step 1355. This completes creation of firewall pinholes, so that in step 1360 RTP media information packets are transmitted between End-Terminal A and End-Terminal B.

Figure 15:
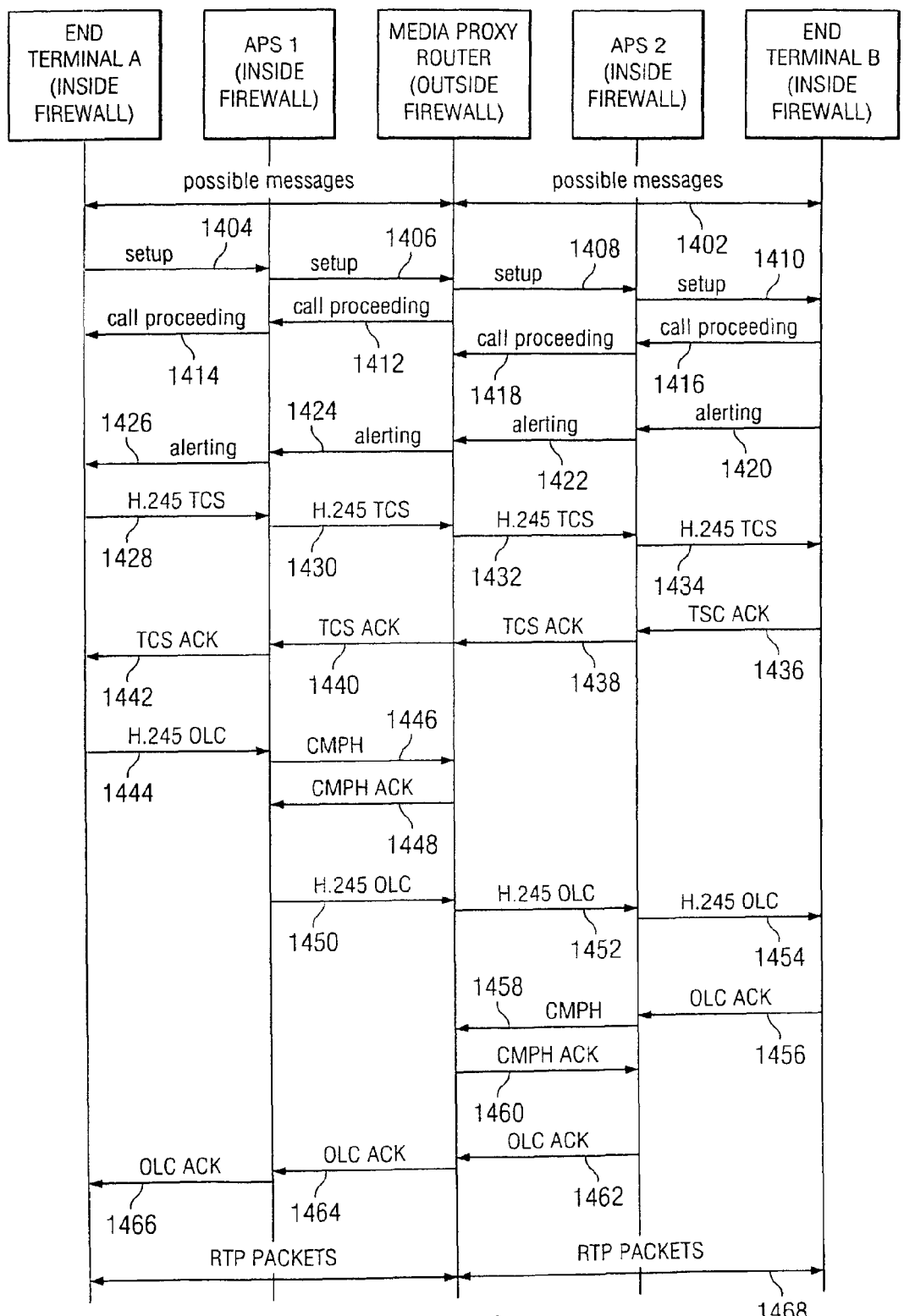
FIG. 15 shows the message flow for the invention with an APS deployed for the H.323 and H.245 protocol.
Figure 16:
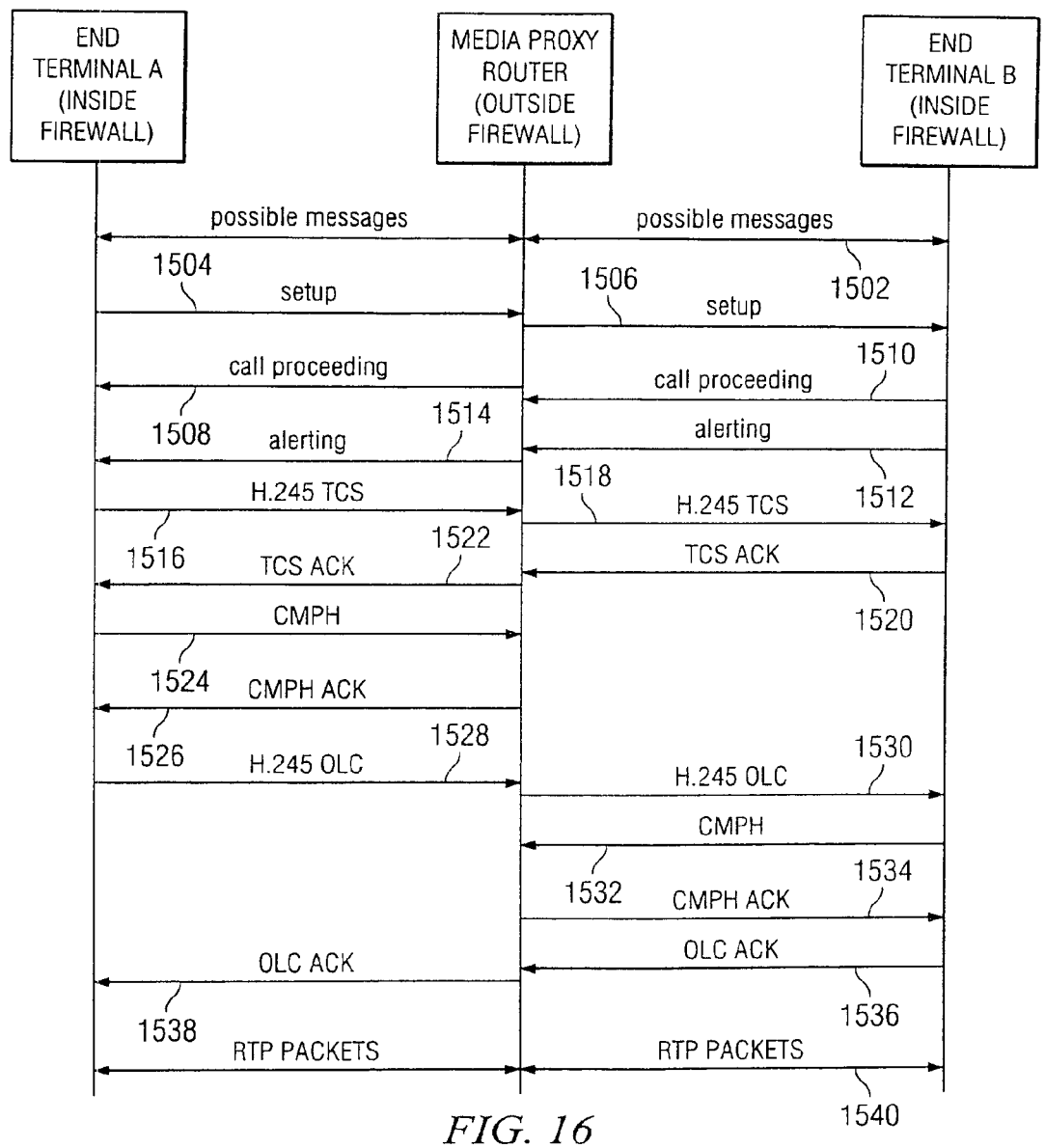
FIG. 16 shows the message flow for the invention without an APS deployed for the H.323 and H.245 protocol.

FIGS. 15 and 16 show the H.323 message flow for penetrating firewalls. The call flows in both FIGS. 15 and 16 assume local ring back. Ring back involves more messages in the call flows. However, the principle for RTP packets to penetrate firewalls through pinholes remains the same.

In FIG. 15, the message flow for H.323 for penetrating firewalls with an APS deployed inside the firewalls is shown. In step 1402, various possible messages are exchanged between the Media Proxy Router and the two End-Terminals. In step 1404, a setup message is transmitted from End-Terminal A to APS 1 on a first network. The APS 1 forwards the setup message to the Media Proxy Router in step 1406. In step 1408, the Media Proxy Router forwards the setup message to APS 2 on a second network. In step 1410, APS 2 forwards the setup message to the End-Terminal B also on the second network.

In step 1412, the Proxy Media Router transmits a call proceeding message to APS 1. In step 1414, APS 1 forwards a call proceeding message to End-Terminal A. In step 1416, End-Terminal B transmits a call proceeding message to APS 2, and APS 2 forwards the call proceeding message to the Proxy Media Router in step 1418. In step 1420, End-Terminal B transmits an alerting message to APS 2. In step 1422, APS 2 forwards the alerting message to the Media Proxy Router. The Media Proxy Router forwards the alerting message to APS 1 in step 1424, and the APS 1 forwards the alerting message to End-Terminal A in step 1426.

In step 1428, End-Terminal A transmits a H.245 TCS message to APS 1. The APS 1 forwards the H.245 TCS message to the Proxy Media Router in step 1430. In step 1432, the Media Proxy Router forwards the H.245 TCS message to APS 2, which in turn forwards the H.245 TCS message to End-Terminal B in step 1434. In step 1436, End-Terminal B responds to the H.245 TSC message with a TSC ACK message transmitted to APS 2. In step 1438, APS 2 forwards the TCS ACK message to the Media Proxy Router. The Media Proxy Router forwards the TCS ACK message to APS 1 in step 1440, and in step 1442, APS 1 forwards the TCS ACK message to End-Terminal A.

In step 1444, End-Terminal A transmits a H.245 Open Logic Channel (OLC) message to APS 1. In step 1446, APS 1 transmits a CMPH message to the Media Proxy Router, and the Media Proxy Router responds with a CMPH ACK message in step 1448. In step 1450, APS 1 transmits a H.245 OLC to message the Media Proxy Router. In step 1452, the Media Proxy Router forwards the H.245 OLC message to APS 2, and APS 2 forwards the H.245 OLC message to End-Terminal B in step 1454. In step 1456, End-Terminal B responds with an Open Logic Channel Acknowledge (OLC ACK) message transmitted to APS 2. APS 2 in turn transmits a CMPH message to the Media Proxy Router in step 1458. In step 1460, the Media Proxy Router transmits a CMPH ACK message to APS 2. In step 1462, APS 2 responds with an OLC ACK message sent to the Media Proxy Router. The Media Proxy Router forwards the OLC ACK message to APS 1 in step 1464, and in step 1466, APS 1 forwards the OLC ACK message to End-Terminal A. This completes creation of firewall pinholes, so that in step 1468 RTP media information packets are transmitted between End-Terminal A and End-Terminal B.

FIG. 16 shows the H.323 message flow for penetrating firewalls with no APS deployed inside the firewalls. In step 1502, various possible messages are exchanged between the Media Proxy Router and two End-Terminals. In step 1504, a setup message is transmitted from End-Terminal A on a first network to the Media Proxy Router. The Media Proxy Router forwards the setup message to End-Terminal B on a second network in step 1506. In step 1508, the Media Proxy Router transmits a call proceeding message to End-Terminal A. In step 1510, End-Terminal B transmits a call proceeding message to the Proxy Media Router. In step 1512, End-Terminal B transmits an alerting message to the Media Proxy Router. In step 1514, the Media Proxy Router transmits an alerting message to End-Terminal A. In step 1516, the End-Terminal A transmits a H.245 TCS message to the Media Proxy Router. In step 1518, the Media Proxy Router forwards the H.245 Terminal Capability Set (TCS) message to End-Terminal B, and in step 1520, End-Terminal B responds with a Terminal Capability Set Acknowledge (TCS ACK) message to the Media Proxy Router. In step 1522, the Media Proxy Router forwards the TCS ACK message to End-Terminal A.

In step 1524, End-Terminal A transmits a CMPH message to the Media Proxy Router, and in step 1526, the Media Proxy Router responds with a CMPH ACK message transmitted to End-Terminal A. The End-Terminal A transmits a H.245 OLC message to the Media Proxy Router in step 1528. In step 1530, the Media Proxy Router forwards the H.245 OLC message to End-Terminal B. In step 1532, End-Terminal B transmits a CMPH message to the Media Proxy Router, which responds with a CMPH ACK message back to End-Terminal B in step 1534. In step 1536, End-Terminal B transmits an OLC ACK message to the Media Proxy Router, which forwards the OCL ACK message to End-Terminal A in step 1538. This completes creation of firewall pinholes, so that in step 1540 RTP media information packets are transmitted between End-Terminal A and End-Terminal B.

While the invention has been particularly shown and described with respect to preferred embodiments, it will be readily understood that minor changes in the details of the invention may be made without departing from the spirit of the invention, I claim:

1. A system for routing information packets across a firewall to a packet-based communication network, the system comprising a media proxy router, the media proxy router comprising:
 a network interface configured to:
  receive a create-pinhole request;
  signal a firewall in response to the create-pinhole request to create a pinhole address in the firewall; and
  receive a first information packet to be transmitted across the firewall via the pinhole address; and
 a packet processor coupled to the network interface and configured to:
  replace an address in the information packet address header information with the pinhole address created in the firewall; and
  forward the information packet via the network interface to a destination address across the firewall using the pinhole address.

2. The system of claim 1, further comprising routing table functionality arranged to create a communication port address routing table association for designated pinhole ports in the firewall using address data from the create-pinhole request.

3. The system of claim 1, wherein the network interface is further configured to:
 receive the create-pinhole request from an end-terminal; and
 send a create-media-pinhole acknowledgement to the end-terminal containing the pinhole address.

4. The system of claim 1, wherein the network interface is further configured to:
 receive the create-pinhole request from an application server; and
 send a create-media-pinhole acknowledgement to the application server.

5. The system of claim 4, wherein the application server is a session initiation protocol proxy server.

6. The system of claim 4, wherein the application server is an integrated access device.

7. The system of claim 4, wherein the application server is an application proxy server.

8. A system for using a pinhole communication port of a firewall of a packet-based communication network, the system comprising a media proxy router for location outside of the communication network, the media proxy router comprising:
    a communication interface configured to:
        couple the media proxy router to the pinhole communication port of the firewall;
        receive a first signal from the communication network, the first signal having an address designation for the pinhole communication port; and
        receive a packet transmission to be sent to a communication device inside the communication network; and
    a packet processor coupled to the communication interface, the packet processor being configured to:
        place the address designation for the pinhole communication port as the address header of the packet transmission; and
        transmit the packet transmission via the communication interface to the pinhole communication port for transmission to the communication device.

9. The system of claim 8, wherein the communication interface is further configured to transmit a second signal to the communication network, the second signal containing the address designation of the communication port, wherein the second signal acknowledges receipt of the first signal.

10. The system of claim 9, wherein the communication interface is further configured to transmit the second signal to a communication device on the communication network.

11. The system of claim 9, wherein the communication interface is further configured to transmit the second signal to a server on the communication network.

12. The system of claim 8, wherein the transmission packet contains voice data.

13. The system of claim 8, wherein the transmission packet is a real time transport protocol information packet.

14. A system for enabling communication through a firewall between a first device outside a communication network and a second device inside the communication network, the system comprising a media proxy router for location outside the communication network, the media proxy router comprising:
    a communication interface configured to:
        couple the media proxy router to the firewall; and
        receive an information packet transmitted by the first device to the second device, the information packet comprising a first destination address designation; and
    a packet processor configured to:
        correlate the first destination address designation with a second destination address designation using a data element stored at the media proxy router; and
        transmit the received information packet with the second address designation via the communication interface, the second address designation being an address of a pinhole in the firewall.

15. The system of claim 14, wherein the first address is an address of the media proxy router.

16. The system of claim 14, wherein the data element is a routing data element that comprises an association between the communications network and the second address.

17. The system of claim 14, wherein the media proxy router is further configured to create the pinhole at the firewall in response to a message received from the second device.

18. The system of claim 14, wherein the media proxy router is further configured to create the pinhole at the firewall in response to a message received from an entity inside the communication network.

19. The system of claim 18, wherein the entity inside the communication network is a proxy server.

* * * * *